(12) United States Patent
Hu et al.

(10) Patent No.: US 9,047,223 B2
(45) Date of Patent: *Jun. 2, 2015

(54) REPLICATING TAG ENTRIES FOR RELIABILITY ENHANCEMENT IN CACHE TAG ARRAYS

(71) Applicant: New Jersey Institute of Technology, Newark, NJ (US)

(72) Inventors: Jie Hu, Livingston, NJ (US); Shuai Wang, Kearny, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/322,883

(22) Filed: Jul. 2, 2014

(65) Prior Publication Data

US 2014/0325138 A1    Oct. 30, 2014

Related U.S. Application Data

(63) Continuation of application No. 13/172,741, filed on Jun. 29, 2011.

(51) Int. Cl.
*G06F 12/00* (2006.01)
*G06F 12/12* (2006.01)
*G06F 12/08* (2006.01)
*G06F 11/14* (2006.01)
*G06F 17/30* (2006.01)
*G06F 11/16* (2006.01)

(52) U.S. Cl.
CPC .......... *G06F 12/122* (2013.01); *G06F 11/1666* (2013.01); *G06F 12/0846* (2013.01); *G06F 11/1451* (2013.01); *G06F 12/0802* (2013.01); *G06F 12/0895* (2013.01); *G06F 12/0811* (2013.01); *G06F 12/0826* (2013.01); *G06F 17/30982* (2013.01)

(58) Field of Classification Search
CPC ............ G06F 12/0802; G06F 12/0895; G06F 11/1451
USPC .......................................... 711/118, 108, 161
See application file for complete search history.

(56) References Cited

U.S. PATENT DOCUMENTS

2007/0186036 A1    8/2007    Bittner, Jr.

OTHER PUBLICATIONS

Kim, S., "Reducing Area Overhead for Error-Protecting Large L2/L3 Caches", IEEE Transactions on Computers, vol. 58, Issue 3, pp. 300-310, Mar. 2009 (Abstract).

(Continued)

Primary Examiner — Aracelis Ruiz
(74) Attorney, Agent, or Firm — Turk IP Law, LLC

(57) ABSTRACT

Technologies are generally described for exploiting program phase behavior to duplicate most recently and/or frequently accessed tag entries in a Tag Replication Buffer (TRB) to protect the information integrity of tag arrays in a processor cache. The reliability/effectiveness of microprocessor cache performance may be further improved by capturing/duplicating tags of dirty cache lines, exploiting the fact that detected error-corrupted clean cache lines can be recovered by L2 cache. A deterministic TRB replacement triggered early write-back scheme may provide full duplication and recovery of single-bit errors for tags of dirty cache lines.

32 Claims, 8 Drawing Sheets

(56) References Cited

OTHER PUBLICATIONS

Kim, J. et al., "SlimTag: Exploiting Tag Bits Similarity to Improve the Reliability of the Data Caches", Design, Automation & Test in Europe Conference & Exhibition, pp. 941-944, Mar. 8-12, 2010.
R. Phelan, "Addressing soft errors in ARM core-based soc", ARM White Paper, ARM Ltd., Dec. 2003.
Sherwood, T. et al., "Automatically characterizing large scale program behavior", Proceedings of the 10th International Conference on Architectural Support for Programming Languages and Operating Systems, pp. 45-57, Oct. 2002.
Zhang, W., "Enhancing data cache reliability by addition of a small fully-associative replication cache", Proceedings of the 18th annual International Conference on Supercomputing, pp. 12-19, 2004.
J. F. Ziegler et al., "IBM experiments in soft fails in computer electronics (1978-1994)", IBM Journal of Research and Development, vol. 40, No. 1, pp. 3-18, Jan. 1996.
L. Li et al., "Soft error and energy consumption interactions: A data cache perspective", in Proc. of the International Symposium on Low Power Electronics and Design, 2004, pp. 132-137.
S. Wang et al., "On the characterization and optimization of on-chip cache reliability against soft errors", IEEE Transactions on Computers, vol. 58, No. 9, pp. 1171-1184, Sep. 2009.
S. Wang et al., "TRB: Tag replication buffer for enhancing the reliability of the cache tag array", in Proc. of IEEE Computer Society Annual Symposium on VLSI, Jul. 5-7, 2010.
J.-C. Lo, "Fault-tolerant content addressable memory", in Proc. of 1993 International Conference on Computer Design, 1993, pp. 193-196.
Salice et al, "Fault-tolerant cam architectures: A design framework", in Proc. of the 17th IEEE International Symposium on Defect and Fault-Tolerance in VLSI Systems, 2002, pp. 233-244.
A. Biswas et al., "Computing architectural vulnerability factors for address-based structures", in Proc. of the IEEE International Symposium on Computer Architecture, Jun. 2005.
H. Wang et al., "Cat-Caching address tags: a technique for reducing area cost of on-chip caches", in Proc. of the 22nd annual International symposium on Computer Architecture, 1995, pp. 381-390.
P. Petrov et al., "Tag compression for low power in dynamically customizable embedded processors", IEEE Transactions on Computer-Aided Design of Integrated Circuits and Systems. vol. 23, No. 7, pp. 1031-1047, Jul. 2004.
S. Wang et al, "Replacing Tag Entries for Reliability Enhancementing Cache Tag Arrays", pp. 29, Apr. 2012.
C. Weaver et al., "Techniques to reduce the soft errors rate in a high-performance microprocessor", in Proc. of the 31st Annual International Symposium on Computer Architecture, 2004.
P. Shivakumar et al., "Modeling the effect of technology trends on the soft error rate of combinational logic", in Proc. of the International Conference on Dependable Systems and Networks, Jun. 2002, pp. 389-398.
S. Kim et al., "Area efficient architectures for information integrity checking in cache memories", in Proc. of International Symposium on Computer Architecture, May 1999, pp. 246-255.
H. Asadi V. et al., "Vulnerability analysis of L2 cache elements to single event upsets", in Proc. of Design, Automation, and Test in Europe, Mar. 2006.
J. Kim N et al., "Multi-bit error tolerant caches using two-dimensional error coding", in Proc. of 40th IEEE/ACM International Symposium on Microarchitecture, Dec. 2007, pp. 197-209.
V. Degalahal L. et al., "Soft errors issues in low-power caches", IEEE Transactions on Very Large Scale Integration Systems, vol. 13, No. 10, pp. 1157-1166, Oct. 2005.
N. N. Sadler et al., "Choosing an error protection scheme for a microprocessor L1 data cache", in Proc. of International Conference on Computer Design, Oct. 2006.
V. Sridharan H et al., "Reducing data cache susceptibility to soft errors", IEEE Transactions on Dependable and Secure Computing, vol. 3, 2006.
S. Wang et al., "Self-adaptive data caches for soft-error reliability", IEEE Transactions on Computer-Aided Design of Integrated Circuits and Systems, vol. 27, No. 8, pp. 1503-1507, Aug. 2008.
W. Zhang, "Computing cache vulnerability to transient errors and its implication", in Proc. of the 20th IEEE International Symposium on Defect and Fault Tolerance in VLSI Systems, Oct. 2005.
G. Asadi V. et al., "Balancing reliability and performance in the memory hierarchy", in Proc. of the IEEE International Symposium on Performance Analysis of Systems and Software, Mar. 2005.
S. Wang et al., "On the characterization of data cache vulnerability in high-performance embedded microprocessors", in Proc. of the 6th International Conference on Embedded Computer Systems: Architectures, Modeling, and Simulation (SAMOS VI), Jul. 2006, pp. 14-20.
J. Yan et al., "Evaluating instruction cache vulnerability to transient errors", ACM SIGARCH Computer Architecture News. vol. 35, No. 4, pp. 21-28, Sep. 2007.
W. Zhang et al., "Icr: in-cache replication for enhancing data cache reliability", in Proc. of the International Conference on Dependable Systems and Networks, 2003.
N. Quach, "High availability and reliability in the itanium processor", IEEE Micro, vol. 20, No. 5, pp. 61-69, 2000.
C. Mcnairy et al., "Itanium 2 processor microarchitecture", IEEE Micro, vol. 23, No. 2, pp. 44-55, 2003.
K. Reick et al., "Fault-tolerant design of the ibm power6 microprocessor", IEEE Micro, vol. 278, No. 2, pp. 30-38, Mar.-Apr. 2008.
D. Burger et al., "The simplescalar tool set, version 2.0", Computer Sciences Department, University of Wisconsin, Tech. Rep. 1342, 1997.
D. Tarjan et al., "Cacti 4.0", HP Laboratories Palo Alto, Tech. Rep, Jun. 2006.
T. Sherwood et al., "Automatically characterizing large scale program behavior", in the 10th International Conference on Architectural Support for Programming Languages and Operating Systems, Oct. 2002.
"Bios and kernel developer's guide for amd athion 64 and amd opteron processors", AMD, Tech. Rep. 2006.

REPLICATING TAG ENTRIES FOR RELIABILITY ENHANCEMENT IN CACHE TAG ARRAYS

This application is a Continuation of application Ser. No. 13/172,741, now U.S. Pat. No. 8,838,897, filed on Jun. 29, 2011, and claims priority to application Ser. No. 13/172,741 under 35 U.S.C. §120. The entire disclosure of the parent application is hereby incorporated by reference for all purposes.

BACKGROUND

Unless otherwise indicated herein, the materials described in this section are not prior art to the claims in this application and are not admitted to be prior art by inclusion in this section.

A processor cache is a cache that can be used by a processor such as the central processing unit (CPU) of a computer to reduce the average time to access memory. The cache is a smaller, faster memory which stores copies of the data from the most frequently used main memory locations. As long as most memory accesses are cached memory locations, the average latency of memory accesses are closer to the cache latency than to the latency of main memory. When the processor needs to read from or write to a location in main memory, the processor first checks whether a copy of that data is in the cache. If so, the processor immediately reads from or writes to the cache, which is typically much faster than reading from or writing to main memory.

Most modern desktop and server processors have at least three independent caches: an instruction cache to speed up executable instruction fetch, a data cache to speed up data fetch and store, and a translation look-aside buffer (TLB) used to speed up virtual-to-physical address translation for both executable instructions and data. Data cache is usually organized as a hierarchy of more cache levels (L1, L2, etc.). Multi-level caches generally operate by checking the smallest Level 1 (L1) cache first; if L1 is hit, the processor proceeds at high speed. If the smaller cache misses, the next larger cache (L2) is checked, and so on, before external memory is checked.

Ionizing radiation induced single-event upsets (SEUs), also known as soft errors, in semiconductor memories have been recognized for a long time as a major reliability issue in electronic systems. Due to their large share of the transistor budget and die area, on-chip caches suffer from a significantly higher soft-error rate (SER) than other on-chip components at the current and near future technologies.

The present disclosure appreciates that reliability of the data array in on-chip caches is further emphasized due to importance of the correctness of cache accesses. An incorrect cache access (i.e., data/instruction read out from wrong cache lines or data written into wrong cache lines) may crash the subsequent computation/communication, external memory, or storage systems, leading to an overall system failure or program inaccuracy. On the other hand, any practical reliable design is subject to various stringent performance, area, and energy constraints.

SUMMARY

The present disclosure generally describes techniques for enhancing microprocessor cache performance by replicating tag entries for reliability enhancement in cache tag arrays. According to some examples, a method for enhancing microprocessor cache performance by replicating tag entries may include creating a tag replication buffer (TRB) in a cache tag locality (CTL), capturing entries of a tag array in an L1 cache, and determining a frequency of access to the tag array. The method may further include storing replicas of entries accessed more frequently than a predefined threshold in the TRB.

According to other examples, a microprocessor with enhanced cache performance employing tag entry replication may be configured to create a tag replication buffer (TRB) in a cache tag locality (CTL), capture entries of a tag array in an L1 cache, and determine a frequency of access to the tag array. The microprocessor may also be configured to store replicas of entries accessed more frequently than a predefined threshold in the TRB.

According to further examples, a computer-readable storage medium is provided with instructions stored thereon for replicating tag entries in a microprocessor cache. The instructions may include creating a tag replication buffer (TRB) in a cache tag locality (CTL), capturing entries of a tag array in an L1 cache, and determining a frequency of access to the tag array. The instructions may further include storing replicas of entries accessed more frequently than a predefined threshold in the TRB.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The below described and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
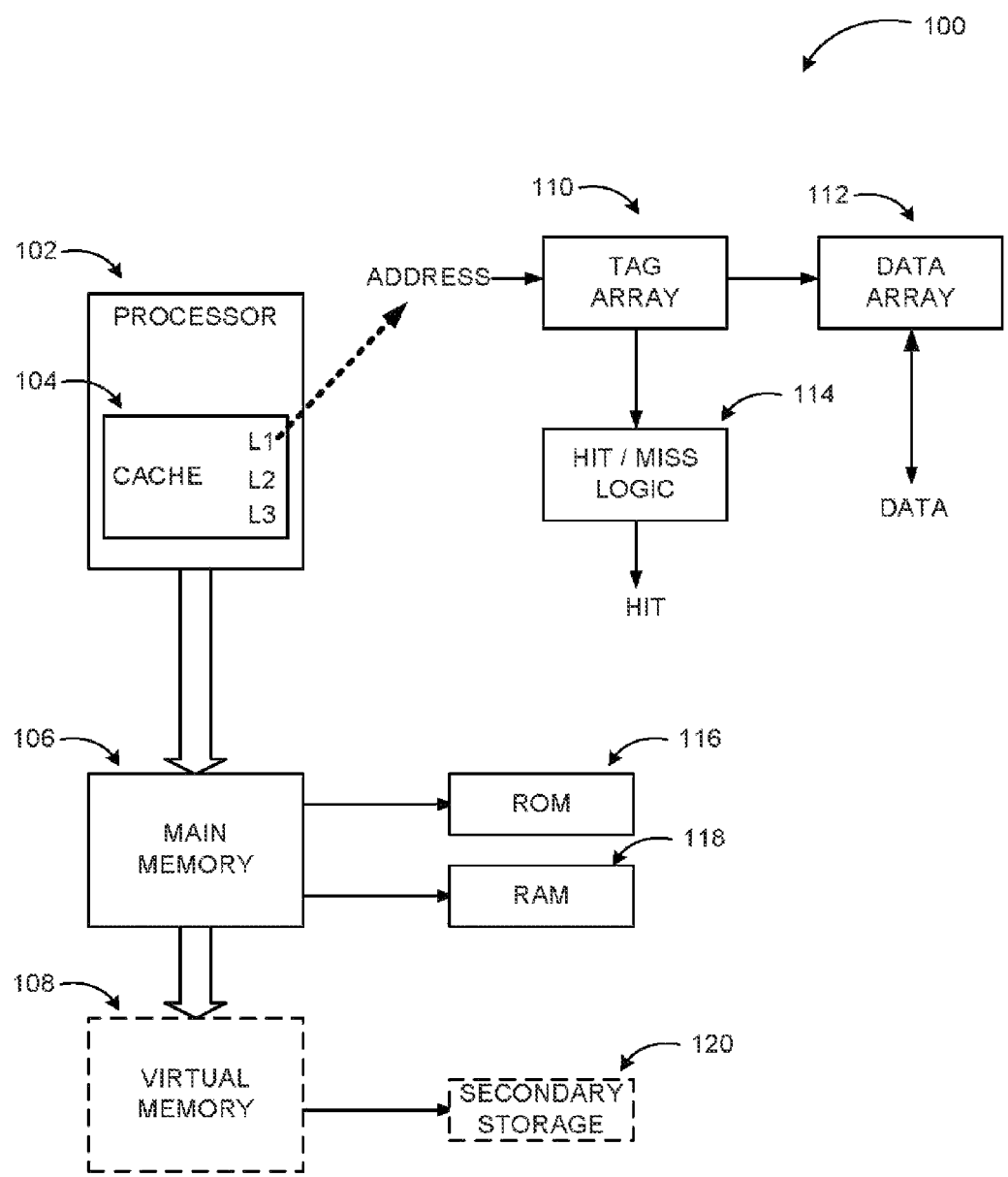
FIG. 1 illustrates a block diagram of major components in a microprocessor with enhanced cache performance through replication of tag array entries.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to enhancing microprocessor cache performance by replicating tag entries for reliability enhancement in cache tag arrays.

Briefly stated, program phase behavior may be exploited to duplicate most recently and/or frequently accessed tag entries in a Tag Replication Buffer (TRB) to protect the information integrity of tag arrays in a processor cache. The reliability/effectiveness of microprocessor cache performance may be further improved by capturing/duplicating tags of dirty cache lines, exploiting the fact that detected error-corrupted clean cache lines can be recovered by L2 cache. A deterministic TRB replacement triggered early write-back scheme may provide full duplication and recovery of single-bit errors for tags of dirty cache lines.

FIG. 1 illustrates a block diagram of major components in a microprocessor with enhanced cache performance through replication of tag array entries arranged in accordance with at least some embodiments described herein.

A processor, such as processor 102 in diagram 100, is adapted to read data from and/or write data to main memory 106 using a cache memory 104. Main memory 106 may include non-volatile and volatile memory, as well as read only memory (ROM) 116, where data is hardcoded one time and persists throughout the lifetime of the memory. Volatile memory may include random access memory (RAM) 118, which typically loses its contents when power is removed. Additionally, virtual memory 108 and secondary storage 120 (e.g. dedicated portions from hard drive(s), remote data storage, etc.) may also be employed. While main memory 106 and virtual memory 108 may store relatively large amounts of data, access time for those memories (latency) tends to be unacceptably high for typical processor operations. Thus, a faster access, smaller cache memory 104 is employed for many processor read/write operations.

Cache memory 104 can be utilized to store copies of the data from the most frequently used main memory locations. Cache memory 104 is usually organized as a hierarchy of more cache levels (L1, L2, L3, etc.). When a read or write operation is executed by the processor 102, the cache memory generally checks the highest level (L1) cache first to determine if the required data is present. If the data is found in the cache, the result is referred to as a cache hit; otherwise if the data is not found in the cache, the result is referred to as a cache miss. When a cache hit occurs, the processor proceeds at higher overall throughput speeds since the process or need not wait to access main memory for the data. If the L1 cache has a cache miss, the next lower cache (L2) is checked, and so on, resulting in slower performance than when a cache hit occurs.

As shown in diagram 100, functional blocks of cache 104 may include a tag array 110, a data array 112, and hit/miss logic 114. The tag array 110 can be utilized to store the addresses of the data contained in the cache memory 104. The data array 112 can be utilized to store the data itself. Hit/miss logic 114 can be utilized to determine which levels of cache hits or misses occur in a particular operation.

In a memory operation (i.e. a read or write to a memory such as main memory 106), processor 102 accesses tag array 110 with a memory address. Once the tag array 110 has been accessed, the output of the tag array 110 may be compared by the hit/miss logic 114 to the address of the memory reference to determine if a cache hit has occurred. Processor 102 may read or modify (e.g., write) the addressed data at the data array 112. Through the division of the cache memory into separate tag and data arrays access time of the cache memory may be reduced. The tag arrays typically may contain fewer bits than the data arrays and, therefore, may be accessed more quickly than the data array or a single combined tag/data array.

Data arrays and tag arrays in on-chip caches need to be reliable due to the importance of the correctness of cache accesses. An incorrect cache access (i.e., data/instruction read out from wrong cache lines or data written into wrong cache lines) may cause errors the subsequent computation/communication, external memory, or storage systems, leading to an overall system failure or program inaccuracy. On the other hand, any practical reliable design is subject to various stringent performance, area, and energy constraints. Conventional technologies rely on cost-effective parity coding rather than costly error correcting codes (ECCs) to protect the L1 cache tag arrays. However, soft errors (a random event that corrupts the value stored in a memory cell without damaging the cell itself) occurring in tag entries of dirty cache lines (cache lines that have been accessed at least once) in the L1 data cache cannot be recovered by the parity coding. Embodiments provide a tag replication buffer (TRB) design for highly cost-effective, reliable cache tag arrays in microprocessors.

Figure 2:
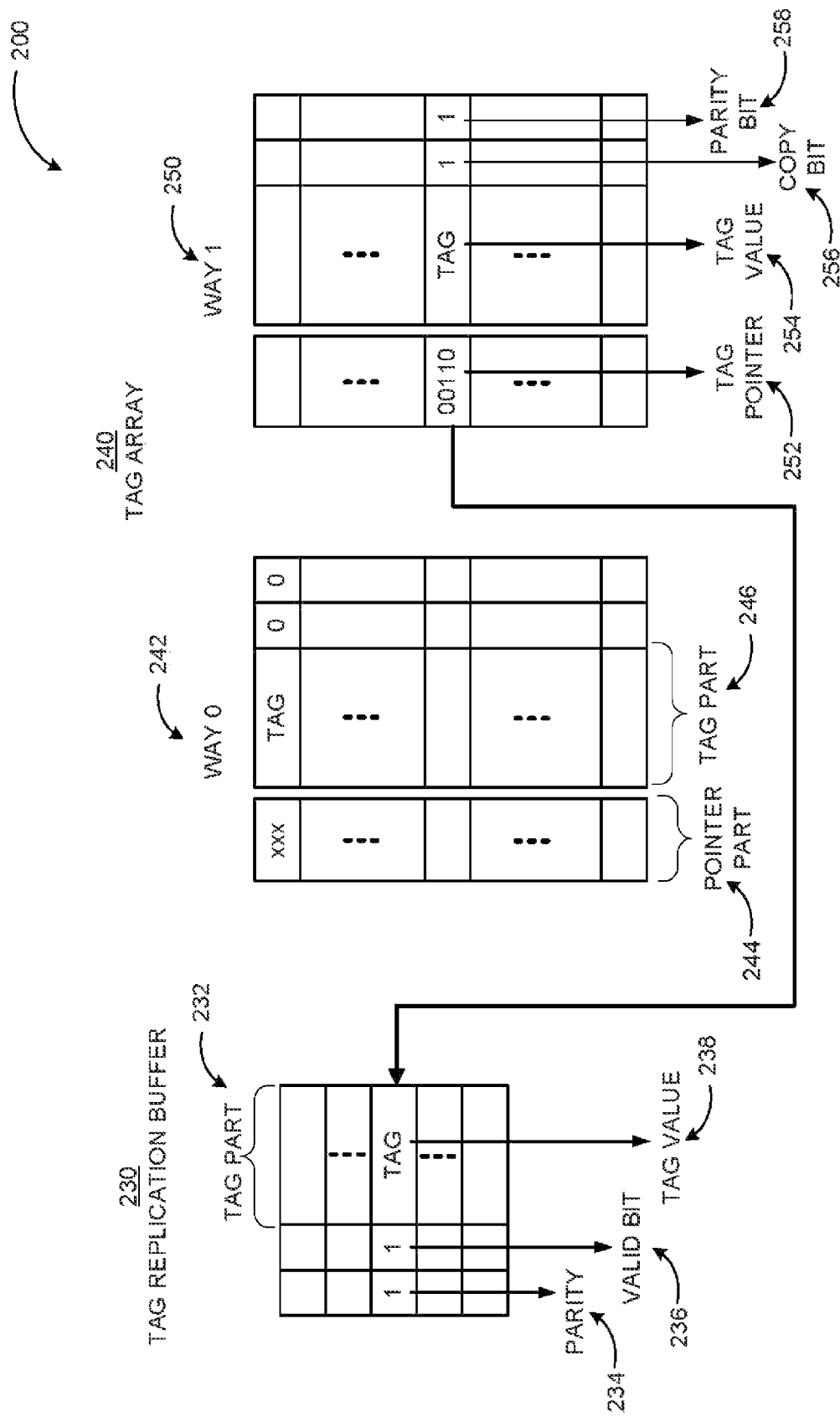
FIG. 2 illustrates an example architecture for tag replication buffer use, where a pointer part is located at the TRB side.

FIG. 2 illustrates an example architecture for tag replication buffer use, where a pointer part is located at the TRB side arranged in accordance with at least some embodiments described herein.

Using the address locality of memory accesses, some embodiments are directed to a tag replication buffer (TRB) that can enhance the reliability of the tag array in the L1 data cache. Microprocessor issued memory accesses may exhibit various localities. The address locality is a form of locality due to the spatial and temporal locality of memory accesses. If a memory address is referenced at a particular time, the same address and nearby memory addresses are very likely to be referenced in the near future. In other words, a small set of the memory addresses are referenced during certain execution time intervals. Since the tag entry of a cache line is the higher portion of the referenced address, the tag entry may have a better locality property than the full memory address. This type of address locality can be referred to as cache tag locality (CTL). Using the CTL, the tag entries may be duplicated in a small cache-like structure, called the tag replication buffer (TRB), to enhance the reliability of the tag array in the data cache.

With the CTL, a relatively small TRB (e.g., 32 entries) can be utilized to capture a substantial portion of the tag references. Thus, by keeping the most recently accessed (MRA) tag entries in the small TRB, a high access-with-replica (AWR) rate may be achieved, increasing reliability for the tag array. It should be noted that although embodiments are discussed targeting the data cache, the same principles also apply to the instruction cache since the instruction cache has a better locality than the data cache.

One of the considerations in the TRB design is how to locate the replica entry in the TRB and how to identify the original tag with its replica. In some approaches a caching address tags (CAT) scheme can be used to optimize the area of the tag array. Since the CAT scheme is aimed at area reduction, this approach replaces the original tag array with a content address memory (CAM) structure that stores the pointers to the tag cache (TC).

According to some embodiments, a pointer design can be adopted that uses the tag cache for replicating tag entries, as shown in diagram 200. In this example implementation, the pointer part 244 for storing pointer values may be located at the original tag array side (240). Each tag entry in the original tag array 240 may be associated with a tag pointer 252 whose value is configured to indicate the location of the tag entry's replica in the TRB 230.

Tag array 240 in diagram 200 is shown as a 2-way mapped cache, which is an associativity improvement scheme that has about the same effect on hit rate as doubling the cache size. Tag array 240 has two identically structured parts: way 0 (242) and way 1 (250). Each tag entry in tag array 240 includes a tag value 254, a parity bit 258, and a copy bit 256. The copy bit 256 may also be a copy identifier comprising multiple bits that may be used to indicate whether the tag entry has a replica in the TRB or not. Parity bit 258 may be used for error coding as will be discussed later. Tag value 254, parity bit 258, and copy bit 256 may be stored in tag part 246 of each way of the tag array 240 as opposed to the pointer part 244, which may be used to store the pointer values.

The TRB 230 includes a tag part 232 that is utilized to store replicas of tag values 238, a parity bit 234 for each entry, and a valid bit 236 for each entry. According to some embodiments, accessing the replica of a tag entry may be achieved by directly following the pointer value stored with the tag entry. According to other embodiments, multiple entries in the tag array 240 can be adapted to share the same replica in the TRB 230. To support this feature, the TRB 230 may be implemented as a CAM structure. When a new replica is to be added to the TRB 230, a CAM search may be performed to check whether the tag value is already in TRB 230 or not. When the CAM search identifies that the tag value is already in TRB 230, a pointer value may be returned to the pointer part 244 in the tag array and this tag entry shares the replica with other tag entries. Otherwise, when the CAM search identifies that the tag value is not already present in TRB 230, a TRB replacement may be performed in case that all TRB entries are occupied. If a TRB entry is replaced, a subsequent CAM search may be invoked in the pointer part 244 of the tag array 240, and the copy bit of tag entries pointing to (sharing) a replica may be cleared.

Figure 3:
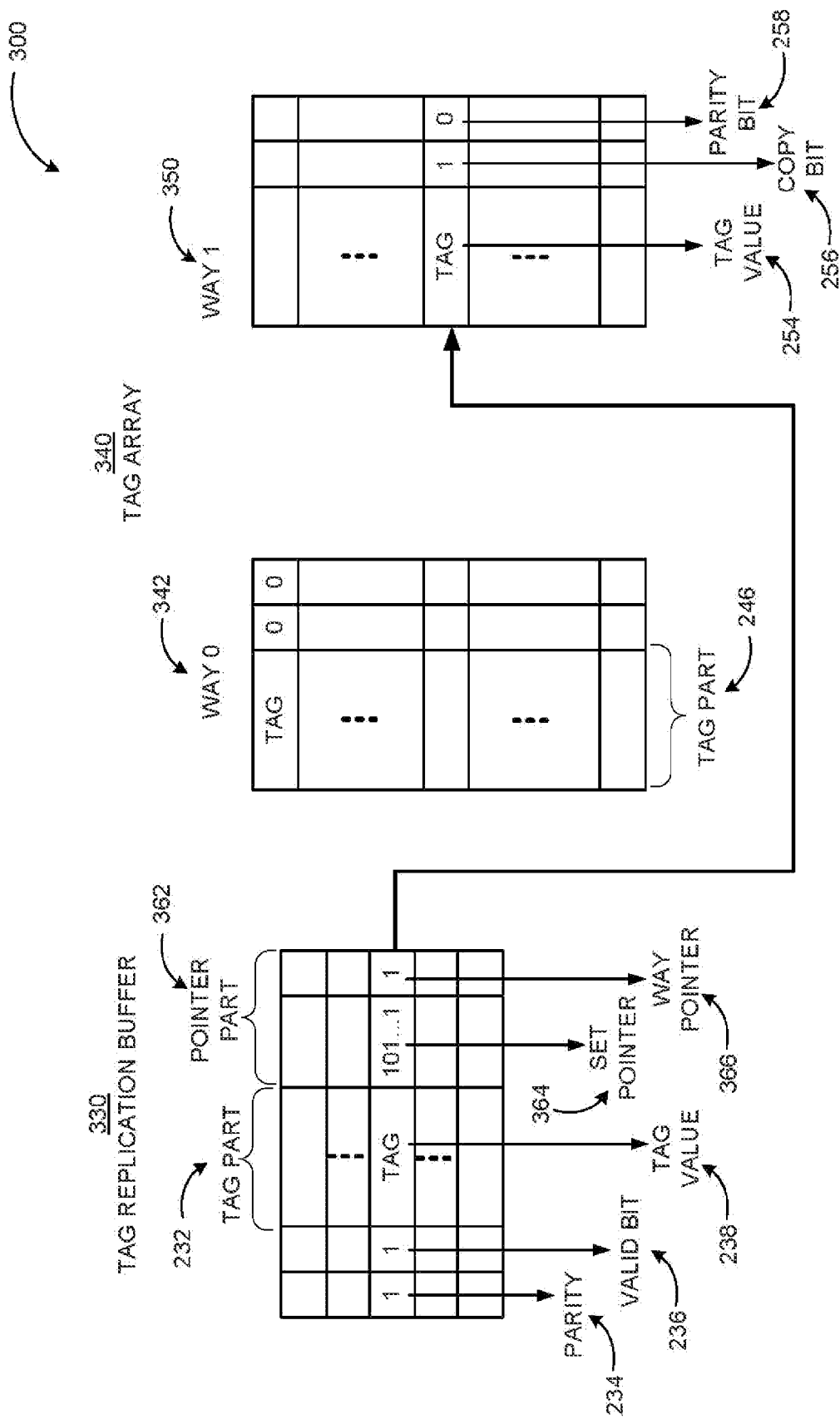
FIG. 3 illustrates an example architecture for tag replication buffer use, where a pointer part is located at the tag array side.

FIG. 3 illustrates an example architecture for tag replication buffer use, where a pointer part is located at the tag array side arranged in accordance with at least some embodiments described herein.

In a CAM implementation, the pointer values in the tag array may incur relatively high area and energy overheads in the processor due to increased number of memory circuits needed in the processor cache. According to some embodiments, area and energy overhead may be further reduced while enhancing cache reliability through the example configuration shown in diagram 300. The example configuration in diagram 300 moves the pointer part 362 from the tag array 340 to the relatively smaller TRB side (330). Each entry in the TRB 330 may be complemented with an additional space to store a pointer value. The pointer part store two pointer values: the set pointer 364 and the way pointer 366. The set pointer may indicate the set of the original tag entry and the way pointer 366 may indicate the way of the original tag entry in a set-associative cache. It should be noted that the way pointer 366 may not be needed in a directly-mapped cache. The copy bit 256 in the original tag array 340 may also be used to indicate whether the tag has a replica or not.

In the example embodiments of diagram 200 and 300, a valid bit 236 may be added to each entry in the TRB to indicate whether the entry is a valid or invalid tag replica. If a tag entry with replica (i.e., the copy bit is set) needs to access its replica in the TRB, the tag entry's set index and way number may be used to perform a CAM search within the pointer part 362 of the small TRB 330. Furthermore, the process of adding a replica to the TRB may be substantially simplified. If the TRB has free (invalid) entries, a tag replica with the set and way pointers may be directly created using a free TRB entry. Otherwise, if the TRB has no free (invalid) entries, a TRB replacement may be performed and the selected target entry may clear the copy bit in the original tag entry that is directly located by the target entry's set and way pointers. Valid entries with TRB 330 may be selected based on first-in-first-out (FIFO) or similar methods for replacement. It should be noted that simplicity and efficiency may be achieved in the configuration of diagram 300 by avoiding the sharing of a tag replica among multiple tag entries.

Figure 4:
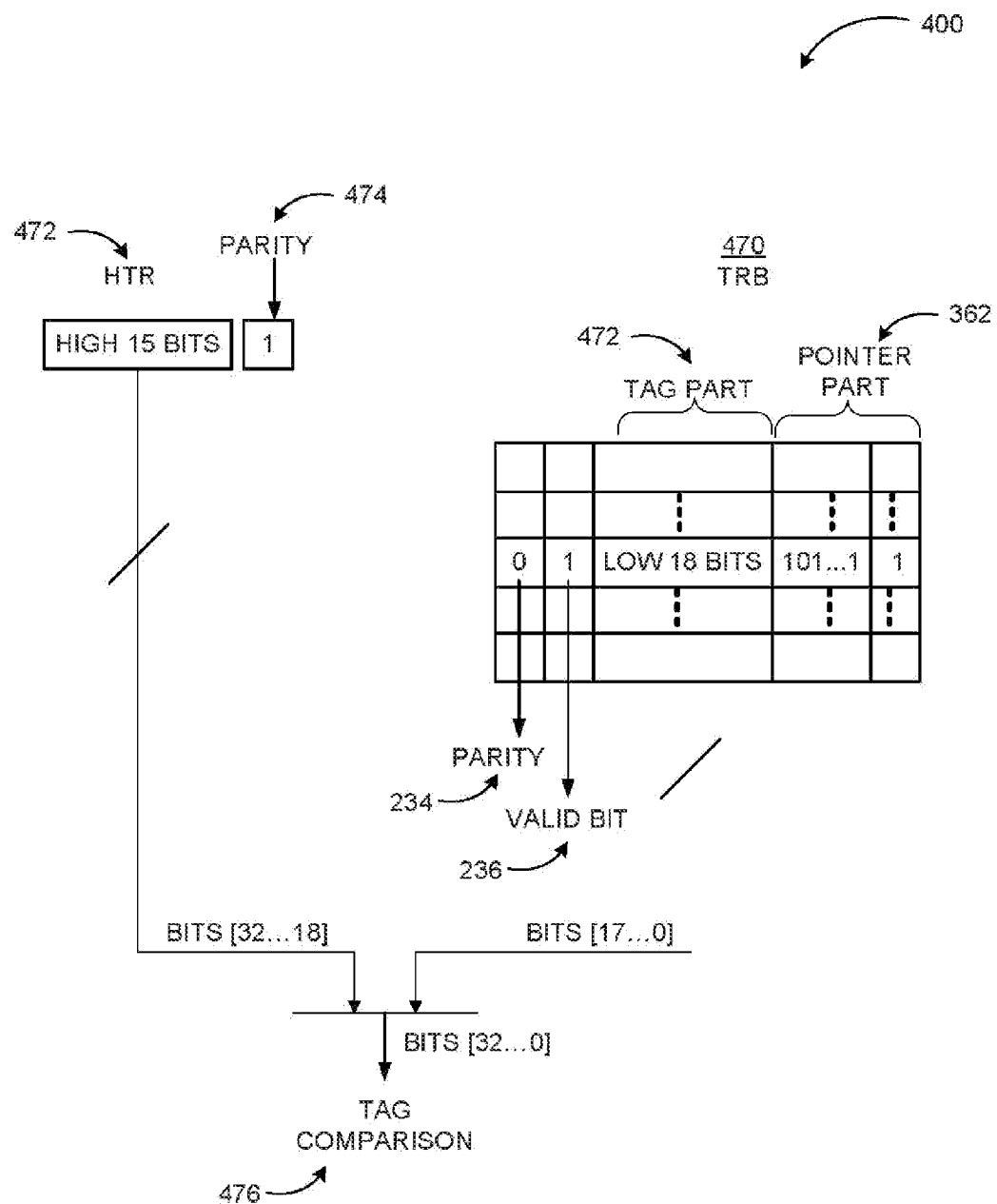
FIG. 4 illustrates an example architecture for tag value compression at TRB side.

FIG. 4 illustrates an example architecture for tag value compression at TRB side arranged in accordance with at least some embodiments described herein. In typical implementations, the leading (higher) 15 bits of the entire tag entry (33 bits) change very little, if any, during the execution. Therefore, a tag value compression may be utilized to improve the area and energy efficiencies of the TRB configuration according to further embodiments.

TRB Side Compression (TBSC), shown in diagram 400 may be utilized to reduce the area and energy overheads of the TRB. TRB 470 according to the example configuration of diagram 400 may include lower bits in tag part 472, pointer values in pointer part 362, parity bits 234, and valid bits 236. High tag register (HTR) 472 may store higher order bits as described below and a parity bit 474. The lower bits from tag part 472 and higher order bits from HTR 472 may be used for tag comparison 476.

The higher order bits (e.g., the upper 15 bits) of the tag replica in the TRB, which may remain substantially unchanged during the execution, may be stored in a special register called a HTR 472, which can be protected by parity coding (parity bit 474). The remaining bits (e.g., the lower 18 bits) may be stored in the tag part 472 of the TRB 470 similar to the original TRB configurations in FIG. 2 and FIG. 3. When there is a TRB write operation, the lower 18 bits can be written to the TRB 470. If a tag entry needs to be recovered from the replica, the values in the HTR 472 and TRB 470 may be read out simultaneously to form the entire tag entry through tag comparison 476. Since the bit size of the TRB can be reduced utilizing this scheme, the area and energy overhead of the TRB may also be reduced.

It should be noted that in some described tag value compression examples, the higher order bits of the tag can be assumed to remain unchanged during the execution. Therefore, the HTR typically should be written at the very beginning of the program execution.

Figure 5:
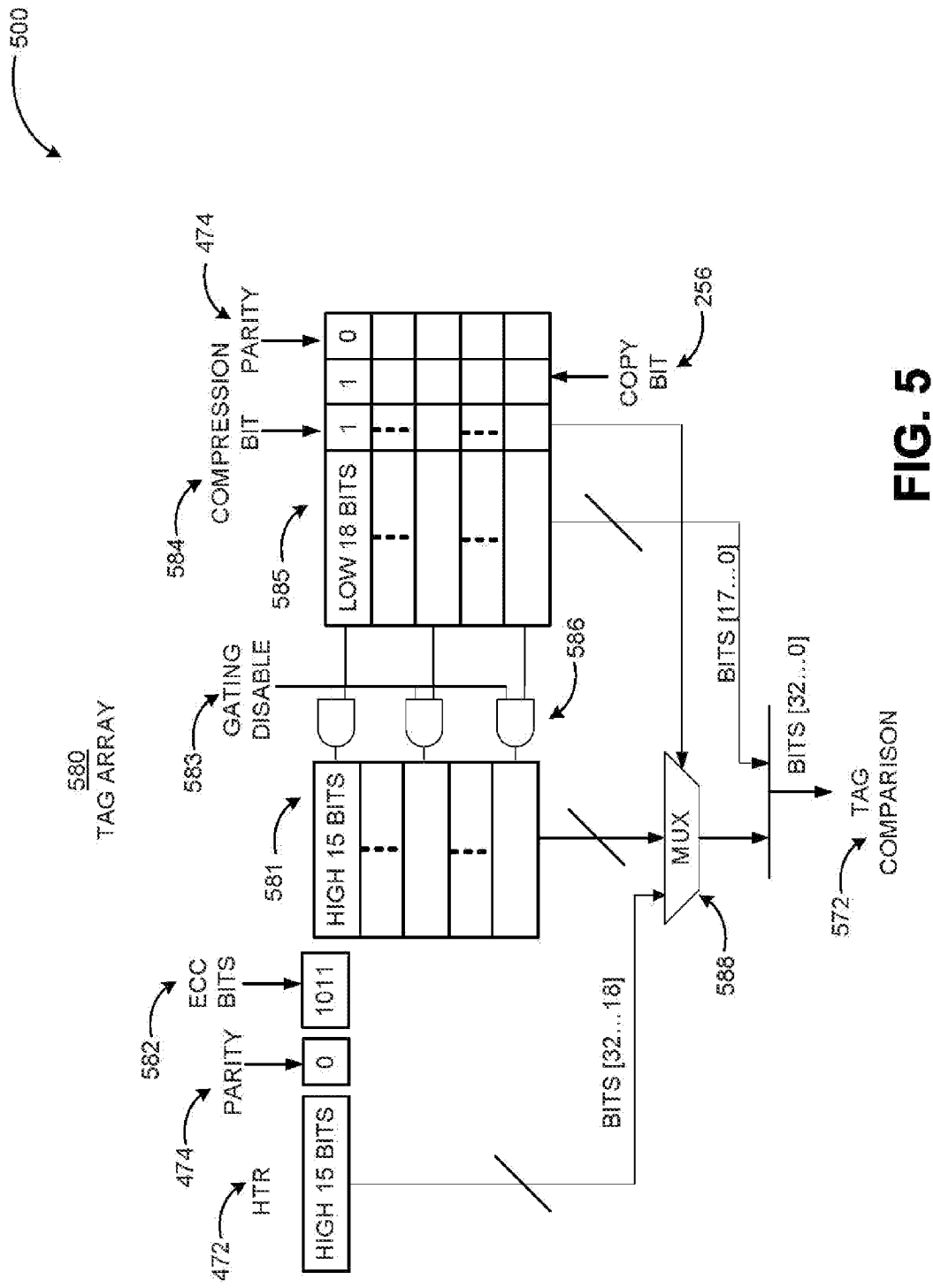
FIG. 5 illustrates an example architecture for tag value compression at tag array side.

FIG. 5 illustrates an example architecture for tag value compression at tag array side arranged in accordance with at least some embodiments described herein. As discussed above, TRB Side Compression (TBSC) may be utilized to reduce the area and energy overheads of the TRB storing the higher order bits of the tag replica in the TRB in the HTR, and storing the remaining bits in the tag part of the TRB. Diagram 500 illustrates another scheme, Tag Array Side Compression (TASC), which may be employed to further reduce the energy consumption in the processor. The TASC scheme moves the HTR from the TRB side (as shown in diagram 400) to the tag array side (as shown in diagram 500).

In the example configuration of diagram 500, tag array 580 includes uncompressed higher order bits (e.g., upper 15 bits) 581, lower order bits (e.g., lower 18 bits) 585, compression bits 584, parity bits 474, and copy bits 256. In some embodiments, tag array 580 may also include disabling gates 583. High tag register (HTR) 472 may be used to store the compressed higher order bits along with parity bit 474 and ECC bits 582. According to some embodiments, a multiplexer 588 may be used for tag comparison 572.

The HTR 472 may be protected by both parity (474) and ECC (582) codes. During a normal access, the value in the HTR 472 and the lower bits 585 in the tag array 580 may be read out, followed by the parity code checking. If the parity checking fails in the HTR 472, then the ECC code 582 may be used to recover from the error. The lower bits or the entire bits (e.g., 33 bits) of the tag may also be protected by the original TRB scheme. The higher bits of the tag array 580 may be gated through disabling gates 583 for energy savings.

In some scenarios, the gating of the higher bits of the tag array 580 may be disabled. In this ungated mode, if a compressed tag is accessed, the tag may need to be restored by using an additional compression bits 584 in the tag entry by selecting the readout either from the higher bits 581 (for uncompressed tags) or from the HTR 472 (for compressed tags), as shown in diagram 500. Furthermore, if the TRB replicates the lower bits of the tag, the TRB may have to be disabled for uncompressed tags. In the illustrated TRB design with TASC compression, the TRB may duplicate the entire tags (e.g., 33-bit).

According to some embodiments, the tag bits including the original ones and the replicas in the TRB may be protected by parity coding as discussed previously. If the single-bit error model is assumed, errors occurring in the tag array may be detected but not recovered with parity coding. When a tag entry is accessed, the parity checking may be performed. If entry passes the check, there is no error in the tag. The normal routine of the cache access may continue. If the parity checking fails, the copy bit(s) may be examined. In a single copy bit example, if the copy bit is one the tag may be assumed to have a replica in the TRB. Then, the TRB may be accessed and the replica read out for error recovery. If the replica passes the parity checking, the original tag may be recovered by copying back from the replica. If the copy bit is zero or the parity checking of the replica fails, the error in the original tag entry may not be corrected by the TRB design. It should be noted that the pointer entry either in the tag array or in the TRB as well as the valid and copy bits are also protected by the parity coding.

According to some embodiments a duplicating with a new cache line (DNC) policy may be employed, which performs the duplication when a new cache line is written into the data cache. According to other embodiments, a DNC+duplicating with a TRB miss (DTBM) policy may be employed, which makes the duplication not only when a new cache line is written into the data cache but also when a hit cache line does not have a tag replica in the TRB. Furthermore, TRB replacement may be performed according to Least Recently Used (LRU), First-In-First-Out (FIFO), or random replacement policies, and/or combinations of those.

The clean cache lines (those without access) in the L1 data cache have their copies in the L2 cache, which can be used to recover from soft errors if the L2 cache is protected by highly reliable error coding schemes (e.g., ECCs) and may be substantially error free, assuming a single bit error model. Unlike the clean cache lines, the dirty cache lines, which have been accessed at least once, do not have replicas in the L2 cache. In a tag array, the consequences of an error-corrupted tag entry are different from that of a cache line. If the tag of a clean cache line is hit by soft errors and is detected by the parity checking during a cache access, this cache line may be simply invalidated and possibly reused to serve a later cache miss. On the other hand, if the tag of a dirty cache line is soft-error corrupted, the latest data may be lost if the error in the tag is detected but not recovered. Thus, tags of dirty cache lines may need a higher protection.

According to some embodiments, a selective TRB scheme that duplicates tags of dirty cache lines may be employed. The selective TRB scheme may reduce the number of tag entries that need to be duplicated. The fewer dirty cache lines the data cache has during the execution, the better AWR rate such a selective TRB approach can achieve.

According to further embodiments, a TRB scheme with early write-back (EWB) in the data cache that is triggered by TRB entry replacement may improve AWR while reducing a vulnerability factor. In this approach, tags of dirty cache lines may be duplicated similar to the selective TRB scheme. When a replica entry in the TRB is replaced in the selective TRB EWB scheme, the entry's corresponding dirty cache line may be forced to write back to the L2 cache. Therefore, all the tags of dirty cache lines may end up having their replicas in the TRB and those dirty cache lines that are to lose their replicas in the TRB may become clean due to the early write-back. Since the replacement in the TRB does not occur frequently with a high AWR rate, the selective TRB EWB scheme may incur substantially fewer L2 cache accesses than the write-through scheme. The selective TRB EWB scheme in the data cache may be deterministic and not prediction based.

Figure 6:
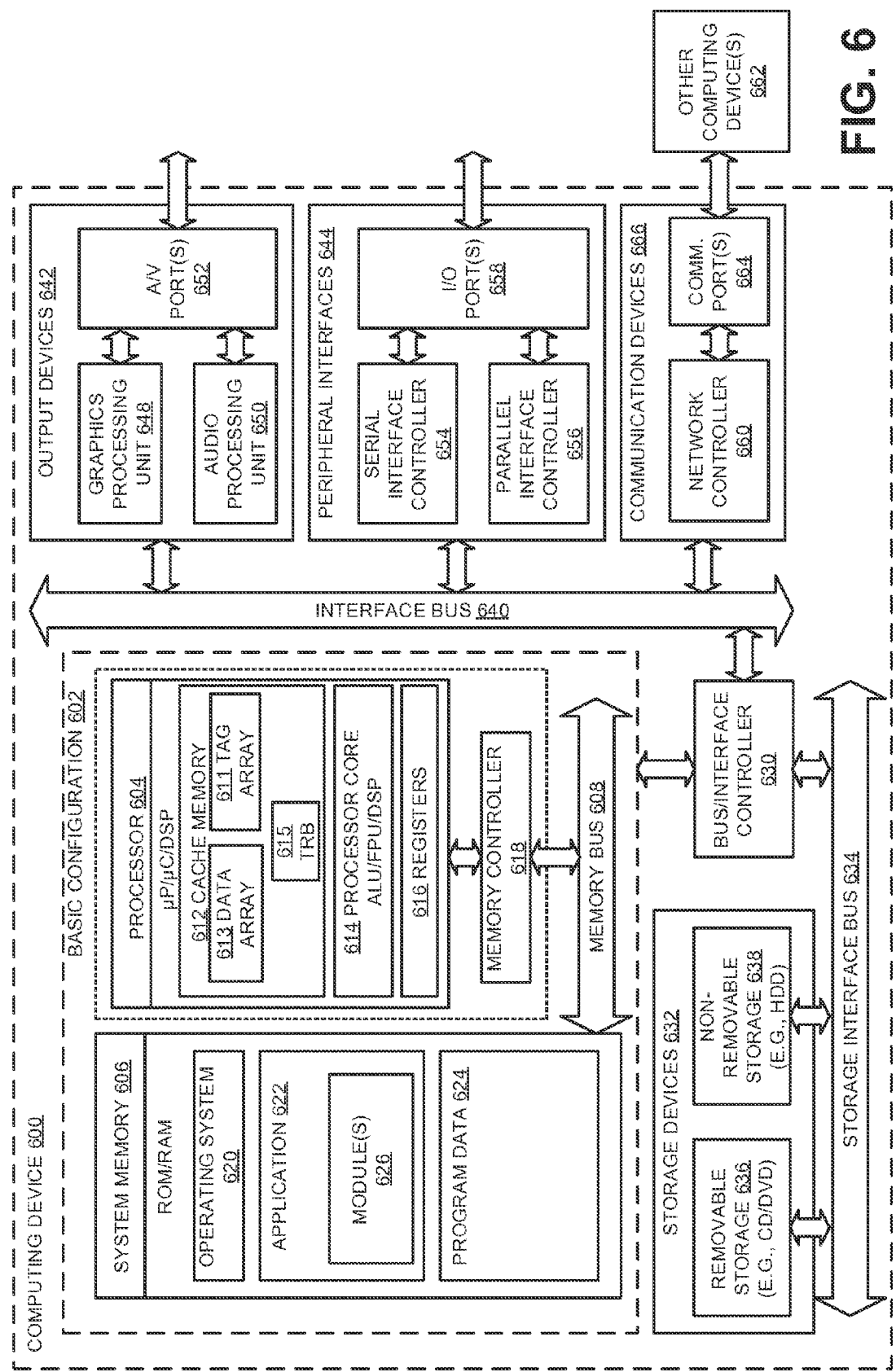
FIG. 6 illustrates a general purpose computing device, which may be used to implement tag array entry replication at a TRB.

FIG. 6 illustrates a general purpose computing device, which may be used to implement tag array entry replication at a TRB arranged in accordance with at least some embodiments described herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (μP), a microcontroller (μC), a digital signal processor (DSP), or any combination thereof. Processor 604 may include one more levels of caching, such as a level cache memory 612, a processor core 614, and registers 616. Example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, an application 622 with module(s) 626, and program data 624. In an operation, cache memory 612 of processor 604 may include a tag array 611 and a data array 613. Most recently and/or frequently accessed tag entries may be duplicated in a Tag Replication Buffer (TRB) 615 to protect the information integrity of tag arrays in the cache memory 612. According to some embodiments, tags of dirty cache lines may be duplicated in the TRB 615, exploiting the fact that detected error-corrupted clean cache lines can be recovered by L2 cache. Furthermore, a deterministic TRB replacement triggered early write-back scheme may provide full duplication and recovery of single-bit errors for tags of dirty cache lines as described in conjunction with FIG. 1 through FIG. 5 above. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 666 to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 666 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a physical server, virtual server, a computing cloud, or a hybrid device that include any of the above functions. Computing device 600 may also be implemented as a personal computer including both laptop computer and non-laptop computer configurations. Moreover computing device 600 may be implemented as a networked system or as part of a general purpose or specialized server.

Networks for a networked system including computing device 800 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Example embodiments may also include methods. These methods can be implemented in any number of ways, including the structures described herein. One such way of implementing a method is by machine operations, of devices of the type described in the present disclosure. Another optional way of implementing a method is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 7:
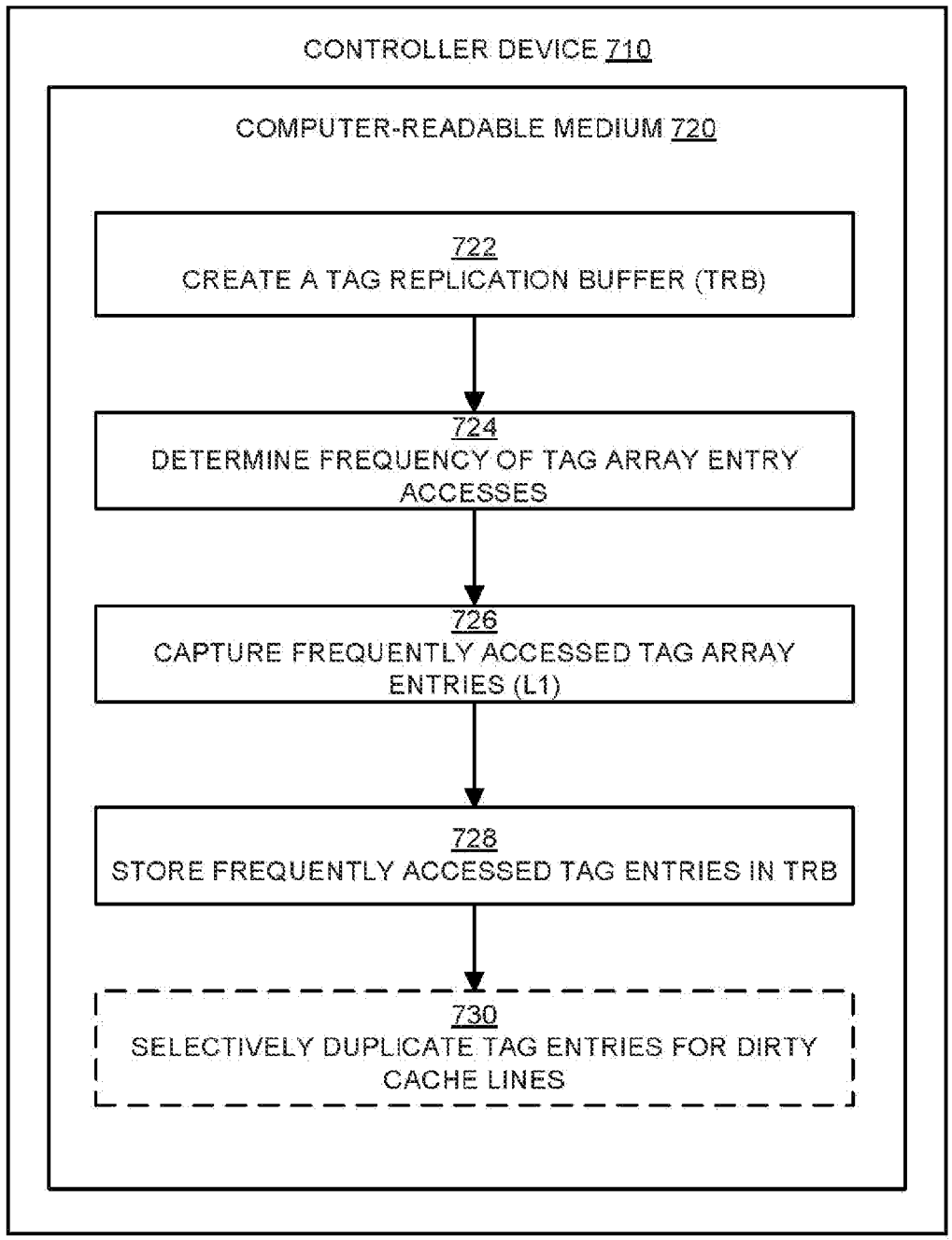
FIG. 7 is a flow diagram illustrating an example method for tag array entry replication at a TRB that may be performed in a computing device such as device 600 in FIG. 6.

FIG. 7 is a flow diagram illustrating an example method for tag array entry replication at a TRB that may be performed in a computing device such as device 600 in FIG. 6, arranged in accordance with at least some embodiments described herein. The method may include one or more operations, functions or actions as is illustrated by blocks 722, 724, 726, 728, and/or 730. The operations described in blocks 722 through 730 may also be stored as computer-executable instructions in a computer-readable medium 720 such as data storage devices 632 of the computing device 600 illustrated in FIG. 6 and executed by a controller device 710 such as processor 604 of computing device 600 of FIG. 6.

The process of FIG. 7 may begin with operation 722, "CREATE A TAG REPLICATION BUFFER (TRB)." At operation 722, processor 604 may create a TRB for replicating select tag array entries in order to enhance tag array reliability. The TRB may be part of the cache itself as a dedicated buffer memory or generated on the fly using available cache memory. Compared to the entire tag array (or data array), the TRB is relatively smaller in size.

Operation 722 may be followed by operation 724, "DETERMINE FREQUENCY OF TAG ARRAY ENTRIES." At operation 724, processor 604 may track which tag entries are accessed (read, written) and determine a frequency of such access. According to some embodiments, most frequently accessed entries above a predefined threshold may be selected for duplication.

Operation 724 may be followed by operation 726, "CAPTURE FREQUENTLY ACCESSED TAG ARRAY ENTRIES (L1)." At operation 726, processor 604 may capture tag array entries that are accessed (read/written) more frequently than a predefined threshold (e.g., most frequently accessed entries).

Operation 726 may be followed by operation 728, "STORE FREQUENTLY ACCESSED TAG ARRAY ENTRIES IN TRB." At operation 726, the captured tag array entries may be stored in TRB 230 by the processor. Pointer values indicating tag array address may be stored in a pointer part at the TRB or on the tag array side.

Operation 728 may be followed by optional operation 730, "SELECTIVELY DUPLICATE TAG ENTRIES FOR DIRTY CACHE LINES." At operation 730, tag array entries for dirty cache lines (cache lines that have been modified as opposed to those that have not been used) may be stored to further enhance tag array reliability exploiting the fact that detected error-corrupted clean cache lines can be recovered by L2 cache.

The operations included in the above described process are for illustration purposes. Replicating tag entries for reliability enhancement in cache tag arrays may be implemented by similar processes with fewer or additional operations. In some examples, the operations may be performed in a different order. In some other examples, various operations may be eliminated. In still other examples, various operations may be divided into additional operations, or combined together into fewer operations.

Figure 8:
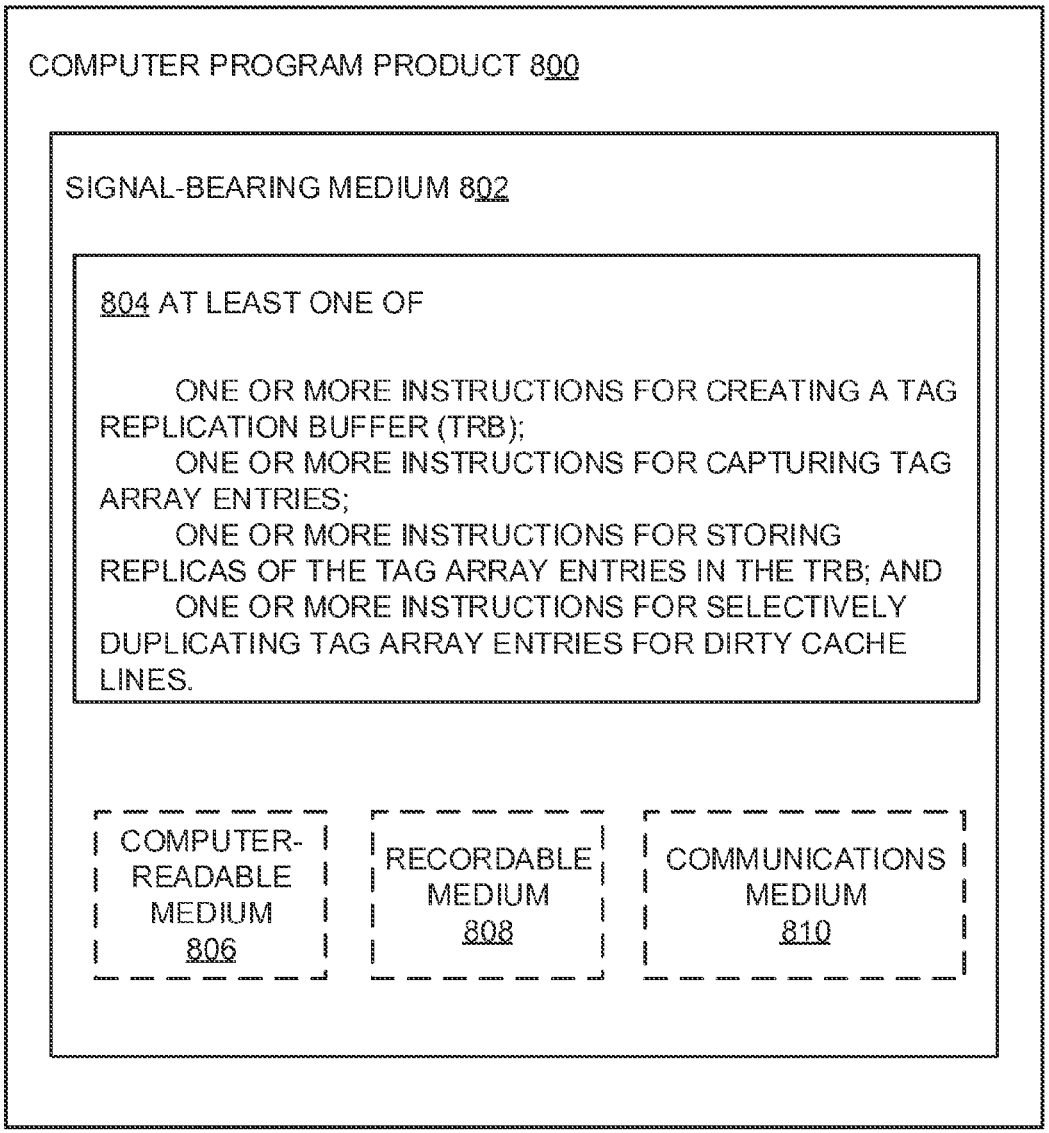
FIG. 8 illustrates a block diagram of an example computer program product, all arranged in accordance with at least some embodiments described herein.

FIG. 8 illustrates a block diagram of an example computer program product, arranged in accordance with at least some embodiments described herein. In some examples, as shown in FIG. 8, computer program product 800 may include a signal bearing medium 802 that may also include machine readable instructions 804 that, when executed by, for example, a processor, may provide the functionality described above with respect to FIG. 6. For example, referring to the computing device 600, processor 604 may undertake one or more of the tasks shown in FIG. 8 in response to instructions 804 conveyed to the processor 604 by the medium 802 to perform actions associated with replicating tag entries for reliability enhancement in cache tag arrays as described herein. Some of those instructions may be include creating a tag replication buffer (TRB), capturing tag entries, storing replicas of the tag array entries in the TRB, and/or selectively duplicating tag array entries for dirty cache lines.

In some implementations, the signal bearing medium 802 depicted in FIG. 8 may encompass a computer-readable medium 806, such as, but not limited to, a hard disk drive, a Compact Disc (CD), a Digital Versatile Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (e.g., a fiber optic cable, a waveguide, a wired communications link, a wireless communication link, etc.). For example, program product 800 may be conveyed to one or more modules of the processor 604 by an RF signal bearing medium, where the signal bearing medium 802 is conveyed by a wireless communications medium 810 (e.g., a wireless communications medium conforming with the IEEE 802.11 standard).

The present disclosure generally presents methods for enhancing microprocessor cache performance by replicating tag entries. An example method may include creating a tag replication buffer (TRB) in a cache tag locality (CTL), determining a frequency of access to the tag array associated with an entry of a tag array, and in response to the frequency of access of the entry exceeding a predefined threshold for the TRB, storing a replica of the entry of the tag array in the TRB.

According to some examples, most recently accessed (MRA) entries may be identified and stored in the TRB, and a size of the TRB may be selected to store between about 8 entries and about 32 entries. The method may further include associating each tag entry in the tag array with a pointer value that identifies a location of a corresponding replica in the TRB, where pointer values are stored in a pointer part in the tag array. A copy identifier may be added to each tag entry to indicate whether the corresponding tag entry has a replica in the TRB or not, and multiple tag entries may share the same replica in the TRB.

According to other examples, the method may include performing a content addressable memory (CAM) search to determine whether a tag value to be replicated is already in the TRB. If the tag entry to be replicated is determined to already be in the TRB, a pointer value may be set for the tag entry in the tag array such that a replicated tag value is shared with at least one other tag entry. If the tag entry to be replicated is determined to not already be in the TRB and all TRB entries are occupied, an oldest TRB entry may be replaced with a replica of the tag entry According to further examples, the method may include storing a replica of the entry of the tag array in the TRB further comprises storing a pointer value indicating a location of the entry in the tag array in a pointer part of the TRB. The method may also include creating a replica in the TRB in response to an entry being written into the tag array at the time a new cache line is brought into a data cache of the L1 cache from an L2 cache, or creating a replica in the TRB in response to one of a new cache line being brought into a data cache of the L1 cache from an L2 cache or a hit cache line lacking a tag replica in the TRB.

According to yet other examples, the method may further include performing a TRB side compression (TBSC) by storing a predefined number of higher order bits of the tag replica in a high tag register (HTR) at the TRB and writing another predefined number of lower order bits of the tag replica to the TRB in response to a TRB write operation. Alternatively, the method may include performing a tag array side compression (TASC) by storing a predefined number of higher order bits of a tag array entry in a high tag register (HTR) at the tag array and writing another predefined number of lower order bits of the tag replica to the TRB in response to a TRB write operation. The method may also include creating replicas of tag array entries for dirty cache lines.

The present disclosure also generally presents microprocessors with enhanced cache performance employing tag entry replication. An example microprocessor may create a tag replication buffer (TRB) in a cache tag locality (CTL), determine a frequency of access to the tag array associated with an entry of a tag array, and in response to the frequency of access of the entry exceeding a predefined threshold for the TRB, store a replica of the entry of the tag array in the TRB.

According to some examples, most recently accessed (MRA) entries may be identified and stored in the TRB, and a size of the TRB may be selected to store between about 8 entries and about 32 entries. The microprocessor may further be adapted to associate each tag entry in the tag array with a pointer value that identifies a location of a corresponding replica in the TRB, where pointer values are stored in a pointer part in the tag array. Multiple tag entries may share the same replica in the TRB.

According to other examples, the microprocessor may perform a content addressable memory (CAM) search to determine whether a tag value to be replicated is already in the TRB. If the tag value is replicated in the TRB, the microprocessor may set a pointer value for the tag entry in the tag array such that a replicated tag value is shared with at least one other tag entry. If the tag value is not replicated in the TRB and all TRB entries are occupied, the microprocessor may replace an oldest TRB entry with a replica of the tag entry.

According to further examples, the microprocessor may store a replica of the entry of the tag array in the TRB by storing a pointer value indicating a location of the entry in the tag array in a pointer part of the TRB. The microprocessor may further store a copy identifier for each entry in the tag array to indicate whether the tag entry has a replica in the TRB or not.

According to yet other examples, the microprocessor may also create a replica in the TRB in response to an entry being written into the tag array at the time a new cache line is brought into a data cache of the L1 cache from an L2 cache. Alternatively, the microprocessor may create a replica in the TRB in response to one of a new cache line being brought into a data cache of the L1 cache from an L2 cache or a hit cache line lacking a tag replica in the TRB. The microprocessor may further perform a TRB side compression (TBSC) by storing a predefined number of higher order bits of the tag replica in a high tag register (HTR) at the TRB and writing another predefined number of lower order bits of the tag replica to the TRB in response to a TRB write operation. The microprocessor may perform a tag array side compression (TASC) by storing a predefined number of higher order bits of a tag array entry in a high tag register (HTR) at the tag array and writing another predefined number of lower order bits of the tag replica to the TRB in response to a TRB write operation. The microprocessor may also create replicas of tag array entries for dirty cache lines.

The present disclosure also generally describes computer-readable storage media having instructions stored thereon for replicating tag entries in a microprocessor cache. Example instructions may include creating a tag replication buffer (TRB) in a cache tag locality (CTL), determining a frequency of access to the tag array associated with an entry of a tag array, and in response to the frequency of access of the entry exceeding a predefined threshold for the TRB, storing a replica of the entry of the tag array in the TRB.

According to some examples, most recently accessed (MRA) entries may be identified and stored in the TRB. The instructions may further include associating each tag entry in the tag array with a pointer value that identifies a location of a corresponding replica in the TRB, wherein pointer values are stored in a pointer part in the tag array. The instructions may further include one or more of: adding a copy identifier to each tag entry to indicate whether the corresponding tag entry has a replica in the TRB or not, and/or performing a content addressable memory (CAM) search to determine whether a tag value to be replicated is already in the TRB.

According to other examples, the instructions may further include one or more of: if the tag entry to be replicated is determined to already be in the TRB, setting a pointer value for the tag entry in the tag array such that a replicated tag value is shared with at least one other tag entry; and/or if the tag entry to be replicated is determined to not already be in the TRB and all TRB entries are occupied, replacing an oldest TRB entry with a replica of the tag entry. The instructions may also include storing a replica of the entry of the tag array in the TRB further comprises storing a pointer value indicating a location of the entry in the tag array in a pointer part of the TRB.

According to further examples, the instructions may further include one or more of: creating a replica in the TRB in response to an entry being written into the tag array at the time a new cache line is brought into a data cache of the L1 cache from an L2 cache; creating a replica in the TRB in response to one of a new cache line being brought into a data cache of the L1 cache from an L2 cache or a hit cache line lacking a tag replica in the TRB; performing a TRB side compression (TBSC) by storing a predefined number of higher order bits of the tag replica in a high tag register (HTR) at the TRB and writing another predefined number of lower order bits of the tag replica to the TRB in response to a TRB write operation; and/or performing a tag array side compression (TASC) by storing a predefined number of higher order bits of a tag array entry in a high tag register (HTR) at the tag array and writing another predefined number of lower order bits of the tag replica to the TRB in response to a TRB write operation.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, materials, and configurations, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control modules (e.g., adjusting matrix factorization parameters such as the predetermined threshold for terminating iterations).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. For example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to enhance cache performance of a microprocessor by replication of a tag entry, the microprocessor comprising one or more cores and a first level (L1) cache coupled to the one or more cores, the method comprising:
    capturing the tag entry of a tag array in the first level (L1) cache;
    tracking a history of access to the tag entry of the tag array;
    determining, based on the history of access to the tag entry of the tag array, that a threshold for a tag replication buffer (TRB) of the microprocessor has been exceeded; and
    in response to the determination that the threshold for the TRB has been exceeded, storing a replica of the tag entry in the TRB.

2. The method according to claim 1, wherein tracking the history of access to the tag entry of the tag array comprises determining one or more of a frequency of access to the tag entry, a recency of access to the tag entry, or a cache state of a cache line that corresponds to the tag entry, including determining whether the cache state is clean, modified, or, is dirty.

3. The method according to claim 2, wherein determining the recency of access comprises determining that the tag entry is among most recently accessed (MRA) tag entries.

4. The method according to claim 1, further comprising:
    associating each tag entry in the tag array with a pointer value that identifies a location of the replica of the tag entry in the TRB, wherein pointer values are stored in a pointer part in the tag array.

5. The method according to claim 4, further comprising:
    adding a copy identifier to each tag entry to indicate whether the tag entry has the replica in the TRB or not, wherein multiple tag entries share the replica in the TRB.

6. The method according to claim 1, further comprising one or more of:
    in response to a determination that the tag entry to be replicated is present in the TRB, setting a pointer value for the tag entry in the tag array such that a replicated tag value is shared with at least one other tag entry; and
    in response to a determination that the tag entry to be replicated is not present in the TRB and that all TRB entries are occupied, replacing an oldest TRB entry with the replica of the tag entry.

7. The method according to claim 1, further comprising one or more of:
    storing a pointer value indicative of a location of the tag entry in the tag array in a pointer part of the TRB; and
    storing a copy identifier for the tag entry in the tag array to indicate whether the tag entry has the replica in the TRB.

8. The method according to claim 1, further comprising one or more of:
    creating the replica in the TRB in response to the tag entry being written into the tag array at a time a new cache line is brought into the first level (L1) cache from a second level (L2) cache;
    creating the replica in the TRB in response to a determination that a hit cache line does not have a tag replica in the TRB for a hit cache line; and
    performing a tag array side compression (TASC) by storage of a third number of higher order bits of the one of the tag entries of the tag array in a high tag register (HTR) and by a write of a fourth number of lower order bits of the replica of the tag array to the TRB in response to another TRB write operation.

9. The method according to claim 1, further comprising:
    employing a duplicating with a new cache line (DNC) policy.

10. The method according to claim 9, further comprising:
    employing a duplication with a TRB miss (DTBM) policy along with the DNC policy.

11. The method according to claim 1, further comprising:
    updating the TRB according to one or more of a least recently used (LRU) policy, a first-in-first-out (FIFO) policy, and a random replacement policy.

12. The method according to claim 1, further comprising:
    replacing a replica entry in the TRB according to a selective TRB early write-back (EWB) scheme; and
    performing a write back of a dirty cache line, wherein the dirty cache line corresponds to the replaced replica entry.

13. The method according to claim 1, further comprising:
    in response to a tag corresponding to a clean cache line being hit by a soft error, invalidating and reusing the clean cache line to serve a later cache miss.

14. The method according to claim 1, wherein storing the replica of the tag entry in the TRB comprises:
    storing the replica in a TRB implemented as a content addressable memory (CAM).

15. The method according to claim 14, further comprising:
    performing search of the CAM to determine whether the tag entry to be replicated is present in the TRB.

16. A non-transitory computer-readable storage medium that includes instructions stored thereon that are executable to replicate a tag entry in a microprocessor cache, the instructions being executable to perform or cause to be performed the method of claim 1.

17. An apparatus, comprising:
    a microprocessor with enhanced cache performance by employment of tag entry replication, the microprocessor comprising one or more cores and a first level (L1) cache coupled to the one or more cores, wherein the microprocessor is configured to:
        capture a tag entry of a tag array in a first level (L1) cache;
        track a history of access to the tag entry of the tag array;
        determine, based on the history of access to the tag entry of the tag array, that a threshold for a tag replication buffer (TRB) of the microprocessor has been exceeded; and
        in response to the determination that the threshold for the TRB has been exceeded, store a replica of the tag entry in the TRB.

18. The apparatus according to claim 17, wherein the history of access includes one or more of a frequency of access to the tag entry, a recency of access to the tag entry, or a cache state of a cache line that corresponds to the tag entry, including determining whether the cache state is clean, modified, or is dirty.

19. The apparatus according to claim 17, wherein the microprocessor is further configured to:
employ one or more of duplicating with a new cache line (DNC) policy and a TRB miss (DTBM) policy along with the DNC policy.

20. The apparatus according to claim 17, wherein the microprocessor is further configured to:
replace the TRB according to one or more of a least recently used (LRU) policy, a first-in-first-out (FIFO) policy, and a random replacement policy.

21. The apparatus according to claim 17, wherein the microprocessor is further configured to:
replace a replica entry in the TRB according to a selective TRB early write-back (EWB) scheme; and
force a dirty cache line corresponding to the replaced replica entry to write back to a second level (L2) cache.

22. The apparatus according to claim 17, wherein the microprocessor is further configured to:
in response to a tag corresponding to a clean cache line being hit by a soft error, invalidate and reuse the clean cache line to serve a later cache miss.

23. The apparatus according to claim 17, wherein multiple tag entries share the replica in the TRB.

24. The apparatus according to claim 17, wherein the microprocessor is further configured to:
perform a content addressable memory (CAM) search to determine whether the tag entry to be replicated is already in the TRB.

25. The apparatus according to claim 24, wherein the microprocessor is further configured to perform one or more of:
in response to a determination that the tag entry to be replicated is already in the TRB, set a pointer value for the tag entry in the tag array such that a replicated tag value is shared with at least one other tag entry;
in response to a determination that the tag entry to be replicated is not already in the TRB and that all TRB entries are occupied, replace an oldest TRB entry with the replica of the tag entry; and
create at least one replica of tag entries of the tag array for dirty cache lines.

26. The apparatus of claim 17, wherein the microprocessor is further configured to:
perform a tag array side compression (TASC) by storage of a third number of higher order bits of the one of the tag entries of the tag array in a high tag register (HTR) and by a write of a fourth number of lower order bits of the replica of the tag array to the TRB in response to another TRB write operation.

27. A microprocessor with enhanced cache performance by employment of tag entry replication, the microprocessor comprising:
one or more cores; and
a first level (L1) cache coupled to the one or more cores;
wherein the one or more cores are configured to:
capture a tag entry of a tag array in the (L1) cache;
track a history of access to the tag entry of the tag array;
determine, based on the history of access to the tag entry of the tag array, that a threshold for a tag replication buffer (TRB) of the microprocessor has been exceeded; and
in response to the determination that the threshold for the TRB has been exceeded, store a replica of the tag entry in the TRB.

28. The microprocessor according to claim 27, wherein the one or more cores are further configured to:
store of a pointer value indicative of a location of the one of the tag entries in the tag array in a pointer part of the TRB; and
store a copy identifier for each entry in the tag array to indicate whether the tag entry has a replica in the TRB or not.

29. The microprocessor according to claim 27, further comprising a second level (L2) cache coupled to the one or more cores, wherein the one or more cores are further configured to:
create a replica in the TRB in response to the one of the tag entries being written into the tag array at a time a new cache line is brought into a data cache of the (L1) cache from the (L2) cache; and
create the replica in the TRB in response to one of a new cache line being brought into a data cache of the (L1) cache from the (L2) cache or a lack of the replica in the TRB for a hit cache line.

30. The microprocessor according to claim 27, wherein the one or more cores are further configured to:
perform a tag array side compression (TASC) by storage of a third number of higher order bits of the one of the tag entries of the tag array in a high tag register (HTR) and by a write of a fourth number of lower order bits of the replica of the tag array to the TRB in response to another TRB write operation.

31. The microprocessor according to claim 27, wherein the history of access includes one or more of a frequency of access to the tag entry, a recency of access to the tag entry, or a cache state of a cache line that corresponds to the tag entry, including determining whether the cache state is clean, modified, or is dirty.

32. The microprocessor according to claim 27, further comprising a second level (L2) cache coupled to the one or more cores, wherein the one or more cores are further configured to one or more of:
employ one or more of duplicating with a new cache line (DNC) policy and a TRB miss (DTBM) policy along with the DNC policy;
replace the TRB according to one or more of a least recently used (LRU) policy, a first-in-first-out (FIFO) policy, and a random replacement policy;
replace a replica entry in the TRB according to a selective TRB early write-back (EWB) scheme; and
force a dirty cache line corresponding to the replaced replica entry to write back to the (L2) cache.

* * * * *

UNITED STATES PATENT AND TRADEMARK OFFICE
CERTIFICATE OF CORRECTION

PATENT NO. : 9,047,223 B2
APPLICATION NO. : 14/322883
DATED : June 2, 2015
INVENTOR(S) : Hu et al.

Page 1 of 2

It is certified that error appears in the above-identified patent and that said Letters Patent is hereby corrected as shown below:

Title Page (63), under "Related U.S. Application Data", in Column 1, Line 1, delete "Jun. 29, 2011." and insert -- Jun. 29, 2011, now U.S. Pat. No. 8,838,897 --, therefor.

On Page 2, (56), under "OTHER PUBLICATIONS", in Column 1, Line 1, delete ""SlimTag:" and insert -- "SimTag: --, therefor.

On Page 2, (56), under "OTHER PUBLICATIONS", in Column 1, Line 28, delete "cam" and insert -- CAM --, therefor.

On Page 2, (56), under "OTHER PUBLICATIONS", in Column 1, Lines 41-42, delete ""Replacing Tag Entries for Reliability Enhancementing Cache Tag Arrays"," and insert -- ""Replicating Tag Entries for Reliability Enhancement Cache Tag Arrays", --, therefor.

On Page 2, (56), under "OTHER PUBLICATIONS", in Column 2, Line 36, delete ""Icr:in" and insert -- "ICR:In --, therefor.

On Page 2, (56), under "OTHER PUBLICATIONS", in Column 2, Line 41, delete "C. Mcnairy et al.," and insert -- C. McNairy et al., --, therefor.

On Page 2, (56), under "OTHER PUBLICATIONS", in Column 2, Line 43, delete "ibm" and insert -- IBM --, therefor.

On Page 2, (56), under "OTHER PUBLICATIONS", in Column 2, Line 43, delete ""Bios and kernel developer's guide for amd athion 64 and amd" and insert -- "BIOS and kernel developer's guide for AMD Athlon 64 and AMD --, therefor.

Signed and Sealed this
Twentieth Day of October, 2015

Michelle K. Lee
*Director of the United States Patent and Trademark Office*

Specification

In Column 1, Below Title, Line 1, insert -- CROSS-REFERENCE TO RELATED APPLICATION --.

In Column 1, Line 8, delete "§120." and insert -- § 120. --, therefor.

In Column 1, above "BACKGROUND", insert -- STATEMENT REGARDING FEDERALLY SPONSORED RESEARCH OR DEVELOPMENT
This invention was made with government support under grant CCF0924279 awarded by the National Science Foundation. The government has certain rights in the invention. --.

In Column 10, Lines 11-12, delete "computing device 800" and insert -- computing device 600 --, therefor.

In Column 12, Line 29, delete "tag entry" and insert -- tag entry. --, therefor.

In Column 14, Line 48, delete "thereof In" and insert -- thereof. In --, therefor.